United States Patent [19]

Miyake et al.

[11] 4,082,971
[45] Apr. 4, 1978

[54] PRINTED MOTOR

[75] Inventors: Shiuichi Miyake, Washimiya; Takao Saito, Tokyo, both of Japan

[73] Assignee: Nihon Radiator Co., Ltd. (Nihon Rajieeta Kabushiki Kaisha), Tokyo, Japan

[21] Appl. No.: 767,429

[22] Filed: Feb. 10, 1977

[51] Int. Cl.² ............................................. H02K 21/10
[52] U.S. Cl. .................................. 310/114; 310/126; 310/268
[58] Field of Search ............... 310/114, 112, 126, 268, 310/266, DIG. 6, 154

[56] References Cited

U.S. PATENT DOCUMENTS

| 3,101,425 | 8/1963 | Moressee et al. | 310/268 |
| 3,169,204 | 2/1965 | Moressee et al. | 310/268 |
| 3,172,028 | 3/1965 | Dechet | 310/114 X |
| 3,230,406 | 1/1966 | Henry-Baudot | 310/268 X |
| 3,312,846 | 4/1967 | Henry-Baudot | 310/266 |
| 3,418,506 | 12/1968 | Parker | 310/268 |
| 3,498,569 | 3/1970 | Kjos | 310/112 X |
| 3,539,817 | 11/1970 | Darrieys | 310/268 X |
| 3,999,092 | 12/1976 | Whiteley | 310/114 X |

Primary Examiner—Donovan F. Duggan
Attorney, Agent, or Firm—Blum, Moscovitz, Friedman & Kaplan

[57] ABSTRACT

A printed motor making use of rotors fitted with two sheets of disk-shaped armatures at right angle to a rotary shaft of the motor, wherein a metallic intermediate ring is inserted between said armatures to improve heat radiation performance of the armatures, thus to provide a small sized motor having large output.

1 Claim, 3 Drawing Figures

PRINTED MOTOR

BACKGROUND OF THE DISCLOSURE

In a usual printed motor, one sheet of armature is mounted on a rotary shaft, and yet it is known such a construction which is provided with two sheets of armatures to increase its output. However, in case of mounting two sheets of adjacent armatures on the rotary shaft, there is interposed air layer between the armatures, so that heat generation due to electric current is difficult to be radiated and sufficient increase of output was limited due to temperature rise.

SUMMARY OF THE INVENTION

The printed motor according to this invention is such that above mentioned disadvantage is eliminated to obtain better heat radiation between two sheets of armature, thus enabling the increase of motor output.

The object of this invention is to provide a printed motor having small size and yet large output by improving heat radiation performance with respect to a motor making use of a rotor provided with two sheets of disk-shaped armatures at right angles to the rotary shaft.

BRIEF DESCRIPTION OF THE DRAWINGS

The accompanying drawings show an embodiment of this invention, wherein.

DESCRIPTION OF THE PREFERRED EMBODIMENT

Figure 1:
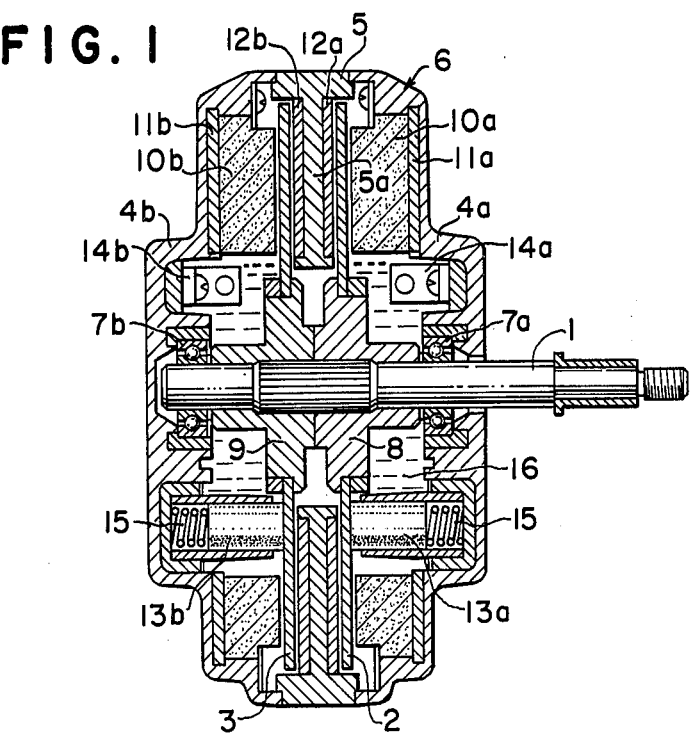
FIG. 1 is a logitudinal and sectional side view.
Figure 2:
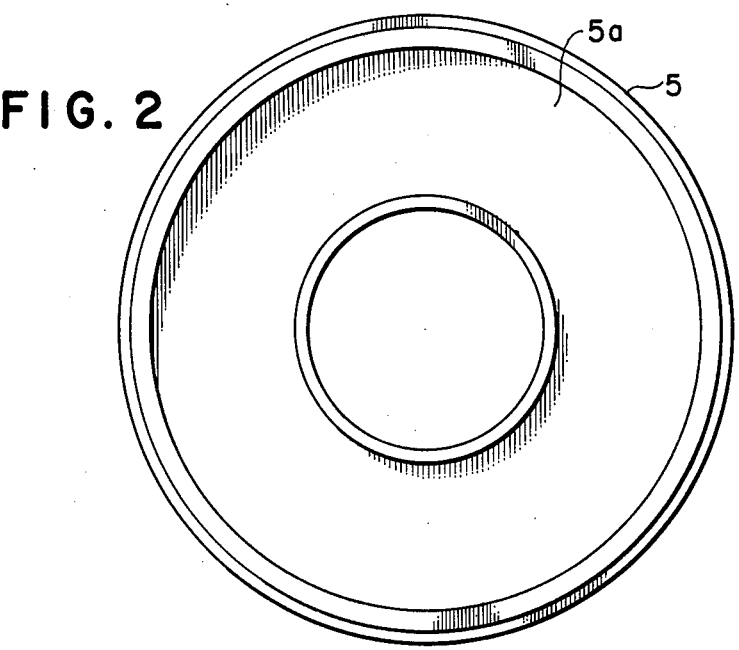
FIG. 2 is a front view, showing an intermediate ring.

As shown in the drawings, two sheets of armatures 2 and 3 are mounted on a rotary shaft 1, which shaft is rotatably mounted between casing pieces 4a and 4b by way of bearings 7a and 7b within a casing 6 made by fixing the casing pieces 4a and 4b made of aluminium on both sides of an intermediate ring 5 made of aluminium. Said rotary shaft 1 is fixed with two hubs 8 and 9, each of which is respectively provided with a sheet of armature 2 and 3 at a short distance. On a confronting surface to the armature 2 of the casing piece 4a, an annular anisotropic ferrite magnet 10a is fixed, which is provided with several couples of magnetic poles alternately, through a yoke 11a, and on another confronting surface to the armature 3 of the casing piece 4b, an annular anisotropic ferrite magnet 10b is similarly fixed through a yoke 11b. And, between the armatures 2 and 3, a plate-shaped portion 5a of the intermediate ring 5 made of aluminium is inserted, and on both surfaces of the plate-shaped portion 5a, yokes 12a and 12b are respectively fixed. 13a and 13b are brush pieces for energizing the armatures 2 and 3, each of which pieces is electrically connected with terminals 14a and 14b and elastically contacted with the armatures by means of springs 15, respectively. 16 is oil within the casing.

Since the printed motor according to this invention is constructed as mentioned above, a closed magnetic circuit is formed for the armature 2 such as N-pole of the magnet 10a→ yoke 12a→ S-pole of the magnet 10a→ yoke 11a→ N-pole of the magnet 10a and a closed magnetic circuit is formed for the armature 3 such as N-pole of the magnet 10b→ → yoke 12b→ S-pole of the magnet 10b→ yoke 11b→ N-pole of the magnet 10b, thus both armatures 2 and 3 cooperate to ratate the rotary shaft 1.

Heat generated in the armature accompanied with the rotation of the printed motor is absorbed by the yoke 12b and the plate-shaped portion 5a of the intermediate ring 5, and is promptly carried within the ring and is radiated from the surface of said ring in the air.

As mentioned above, a metallic body having good heat conductivity is inserted between two sheets of armatures 2 and 3 adjacent to each armature, so that the effect of suppressing temperature rise of the printed motor is larger than in the case when air layer is existing between said armatures 2 and 3.

Figure 3:
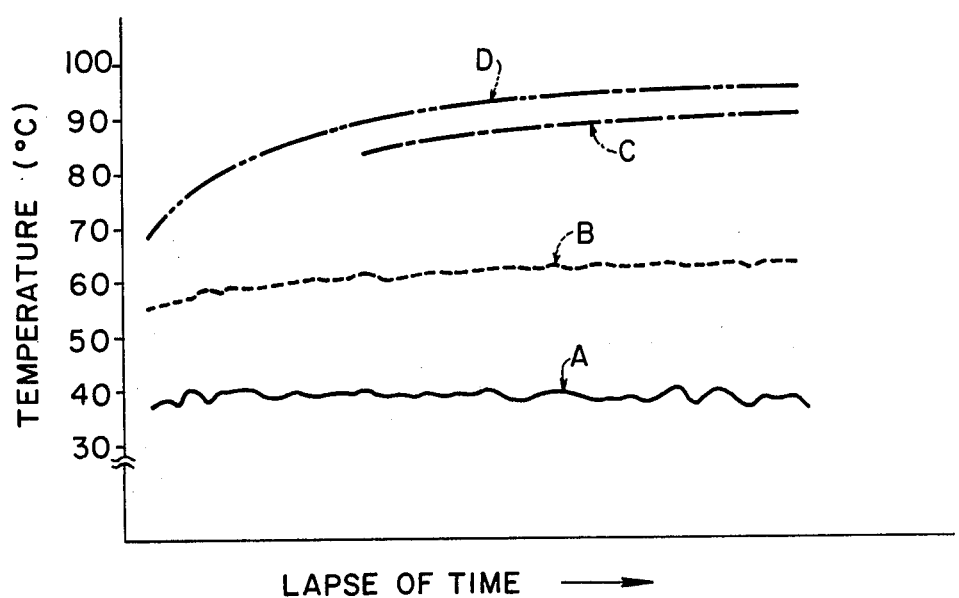
FIG. 3 is a diagram showing the result of temperature rise test.

FIG. 3 shows an example of temperature rise test of the printed motor according to this invention, and the relation between time and temperature in case the print motor is used for the cooling fan of radiator of an automobile. In this figure, A is a curve showing the temperature of air prior to its inflow into the radiator, B a curve showing the temperature of air after it has passed through the radiator, C a curve showing the temperature of the casing pieces 4a and 4b, and D a curve showing the temperature of outer surface of the intermediate ring 5. The outer surface of the intermediate ring 5 is a smooth cylindrical plane. If radiation fins are formed on the outer surface of the casing pieces 4a, 4b and of the intermediate ring, the temperature of each part may be lowered still more.

The printed motor according to this invention is such that in a motor of small size and large output having two sheets of armatures, as mentioned above, the radiation of heat generated from the armatures is made better by inserting a metallic intermediate ring between the armatures, and the yoke 12b is supported by the intermediate ring to reduce the resistance of magnetic circuit, so that large effect is taken in practical use.

Further, when the conditions on design of the armature are varied (for instance, number of coils is varied to change designed speed of rotation) to operate each armature singly, jointly and differentially by means of change-over switches, the printed motor may be used for a varible speed motor with good efficiency.

What is claimed is:

1. A printed motor, comprising two sheets of disk-shaped armatures (2, 3) mounted on a rotary shaft (1), which is borne by casing pieces (4a, 4b) provided with yokes (11a, 11b) on the sides confronting to the armatures (2, 3), a metallic intermediate ring (5) having a plate-shaped portion (5a) provided with yokes (12a, 12b) on both sides thereof and inserted between the armatures (2, 3), said intermediate ring (5) being connected between the casing pieces (4a, 4b) to form a casing (6).

* * * * *